United States Patent
Versteyhe et al.

(10) Patent No.: US 9,856,932 B2
(45) Date of Patent: Jan. 2, 2018

(54) SYSTEM AND METHOD TO PREDICT THE REMAINING USEFUL LIFE OF A CLUTCH BY COEFFICIENT OF FRICTION ESTIMATION

(71) Applicant: DANA LIMITED, Maumee, OH (US)

(72) Inventors: Mark R. J. Versteyhe, Oostkamp (BE); Keivan Shariatmadar, Eeklo (BE)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 14/392,379

(22) PCT Filed: Sep. 5, 2014

(86) PCT No.: PCT/US2014/054343
§ 371 (c)(1),
(2) Date: Mar. 4, 2016

(87) PCT Pub. No.: WO2015/035204
PCT Pub. Date: Mar. 12, 2015

(65) Prior Publication Data
US 2016/0258498 A1    Sep. 8, 2016

Related U.S. Application Data

(60) Provisional application No. 61/874,637, filed on Sep. 6, 2013.

(51) Int. Cl.
*F16D 48/06*    (2006.01)

(52) U.S. Cl.
CPC ......... *F16D 48/062* (2013.01); *F16D 48/066* (2013.01); *F16D 2500/1024* (2013.01);
(Continued)

(58) Field of Classification Search
CPC ............... F16D 48/062; F16D 48/066; F16D 2500/1024; F16D 2500/1027;
(Continued)

(56) References Cited

U.S. PATENT DOCUMENTS 4,126,052 A * 11/1978 Jackman ............... F16H 15/38
                                                                476/10
5,723,779 A    3/1998 Hara et al.
(Continued)

FOREIGN PATENT DOCUMENTS

DE    102007044037 A1    8/2008
DE    102011080713 A1    3/2012

OTHER PUBLICATIONS

European Patent Office, International Search Report and Written Opinion of PCT/US2014/054343, dated Sep. 23, 2015, 9 pages, European Patent Office, Rijswijk, Netherlands.

*Primary Examiner* — Anne M Antonucci
(74) *Attorney, Agent, or Firm* — Marshall & Melhorn, LLC

(57) ABSTRACT

A system and method for determining a remaining useful life of a portion of a wet clutch system is provided. The system comprises a first clutch assembly, a proportional valve, a sensor, and a controller. The proportional valve regulates a pressure applied to the first clutch assembly. The sensor measures a response of the first clutch assembly during one of engaging and disengaging a first portion of the first clutch assembly with a second portion of the first clutch assembly. The controller controls the proportional valve, calculates a mean coefficient of friction of the first clutch assembly based on the sensed response of the first clutch assembly, and determines a remaining useful life of a portion of the wet clutch system based on the mean coefficient of friction of the first clutch assembly.

20 Claims, 4 Drawing Sheets

(52) U.S. Cl.
CPC ........... *F16D 2500/1027* (2013.01); *F16D 2500/1045* (2013.01); *F16D 2500/10412* (2013.01); *F16D 2500/3024* (2013.01); *F16D 2500/3026* (2013.01); *F16D 2500/3027* (2013.01); *F16D 2500/30401* (2013.01); *F16D 2500/30402* (2013.01); *F16D 2500/30406* (2013.01); *F16D 2500/5012* (2013.01); *F16D 2500/5023* (2013.01); *F16D 2500/7041* (2013.01); *F16D 2500/70217* (2013.01); *F16D 2500/70252* (2013.01); *F16D 2500/70282* (2013.01); *F16D 2500/70406* (2013.01); *F16D 2500/70668* (2013.01)

(58) Field of Classification Search
CPC ... F16D 2500/10412; F16D 2500/1045; F16D 2500/3024; F16D 2500/3026; F16D 2500/3027; F16D 2500/30401; F16D 2500/30402; F16D 2500/30406; F16D 2500/5012; F16D 2500/70217; F16D 2500/70252; F16D 2500/70282; F16D 2500/70406; F16D 2500/7041; F16D 2500/70668

See application file for complete search history.

(56) References Cited

U.S. PATENT DOCUMENTS

| | | | |
|---|---|---|---|
| 6,040,768 | A | 3/2000 | Drexl |
| 6,117,048 | A | 9/2000 | Toyama |
| 7,844,428 | B2 | 11/2010 | Olsson |
| 8,405,497 | B2 | 3/2013 | Okabe et al. |
| 8,600,612 | B2 | 12/2013 | Kneissler et al. |
| 2010/0200357 | A1 | 8/2010 | Okabe et al. |
| 2013/0253791 | A1* | 9/2013 | Hodrus .......... F16D 48/06 701/67 |

* cited by examiner

SYSTEM AND METHOD TO PREDICT THE REMAINING USEFUL LIFE OF A CLUTCH BY COEFFICIENT OF FRICTION ESTIMATION

RELATED APPLICATION

The present application claims the benefit of U.S. Provisional Application No. 61/874,637 filed on Sep. 6, 2013, which is incorporated herein in its entirety by reference.

FIELD OF THE INVENTION

The invention relates to vehicle monitoring and prognostics systems and, more particularly, to a monitoring and prognostics system for use with wet clutches.

BACKGROUND OF THE INVENTION

Wet clutches are well-known and used products. Wet clutches are utilized in many applications, including by way of example, wet-plate transmissions for off-highway vehicles and axle brakes. Typically, wet clutches are used to engage a portion of a driveline with a vehicle output or portions of a transmission to engage a specific gear ratio.

Friction separator discs, or plates, are a critical part of wet clutch shifting. During wet clutch shifting, the friction plates gradually degrade as their friction layer is worn off from physical and chemical processes. When the friction plates degrade, a torque transmission capability and a reaction of the wet clutch can be significantly reduced.

Currently, a remaining useful life of a clutch may be calculated in a static manner based on a number of shifts performed and/or a total time the clutch is used. As a result, the friction plates may be changed either too early, which results in unnecessary servicing of the wet clutch, or too late, which results in damage to the wet clutch.

At least one system is commercially available that is used for monitoring and prognostics of automatic transmission fluids for on-highway vehicles, known as Allison prognostics, supplied by Allison Transmission, Inc. While the details of the operation of Allison prognostics are not fully known, such a system does not appear to provide any information on a mean coefficient of friction for a clutch monitored by the system.

Therefore, the development of a monitoring and prognostics system for the friction plates is of paramount importance to achieve an optimal maintenance strategy for vehicles equipped with shifting wet clutch systems.

It would be advantageous to develop a monitoring and prognostics system used with a wet clutch system having friction plates that implements an optimal maintenance strategy based on information available from existing sensors used with the wet clutch system.

SUMMARY OF THE INVENTION

Presently provided by the invention, a monitoring and prognostics system used with a wet clutch system having friction plates that implements an optimal maintenance strategy based on information available from existing sensors used with the wet clutch system, has surprisingly been discovered.

In one embodiment, the present invention is directed to a method for determining a remaining useful life of a portion of a wet clutch system. The wet clutch system comprises a first clutch assembly rotatingly disposed in a housing, a first portion of the first clutch assembly drivingly engaged with an input member and a second portion of the first clutch assembly drivingly engaged with an output member, a proportional valve for regulating a pressure applied to the first clutch assembly, a controller controlling the proportional valve, and a sensor for measuring a response of the first clutch assembly. The method comprises the steps of providing the wet clutch system, actuating the first clutch assembly to one of engage and disengage the first portion of the first clutch assembly with the second portion of the first clutch assembly, sensing a response of the first clutch assembly during one of engaging and disengaging the first portion of the first clutch assembly with the second portion of the first clutch assembly, calculating a mean coefficient of friction of the first clutch assembly based on the sensed response of the first clutch assembly, and determining a remaining useful life of a portion of the wet clutch system based on the mean coefficient of friction of the first clutch assembly.

In another embodiment, the present invention is directed to a method for determining a remaining useful life of a portion of a wet clutch system. The wet clutch system comprises a first clutch assembly rotatingly disposed in a housing, a first portion of the first clutch assembly drivingly engaged with an input member and a second portion of the first clutch assembly drivingly engaged with an output member, a second clutch assembly rotatingly disposed in a housing comprising a first portion drivingly engaged with an input member and a second portion drivingly engaged with an output member, a proportional valve for regulating a pressure applied to the first clutch assembly and the second clutch assembly, a controller controlling the proportional valve, and a sensor for measuring a response of the first clutch assembly and the second clutch assembly. The method comprises the steps of providing the wet clutch system, actuating the first clutch assembly to one of engage and disengage the first portion of the first clutch assembly with the second portion of the first clutch assembly, actuating the second clutch assembly to one of engage and disengage the first portion of the second clutch assembly with the second portion of the second clutch assembly, sensing a response of one of the first clutch assembly and the second clutch assembly in response to actuation of one of the first clutch assembly and the second clutch assembly, calculating a mean coefficient of friction of one of the first clutch assembly and the second clutch assembly based on the sensed response of one of the first clutch assembly and the second clutch assembly, and determining a remaining useful life of a portion of the wet clutch system based on the mean coefficient of friction of one of the first clutch assembly and the second clutch assembly.

In yet another embodiment, the present invention is directed to a system for determining a remaining useful life of a portion of a wet clutch system. The system comprises a first clutch assembly, a proportional valve, a sensor, and a controller. The first clutch assembly is rotatingly disposed in a housing and a first portion of the first clutch assembly is drivingly engaged with an input member and a second portion of the first clutch assembly is drivingly engaged with an output member. The proportional valve regulates a pressure applied to the first clutch assembly. The sensor measures a response of the first clutch assembly during one of engaging and disengaging the first portion of the first clutch assembly with the second portion of the first clutch assembly. The controller controls the proportional valve, calculates a mean coefficient of friction of the first clutch assembly based on the sensed response of the first clutch assembly, and determines a remaining useful life of a portion of the wet clutch system based on the mean coefficient of friction of the first clutch assembly.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

A remaining useful life (RUL) clutch monitoring and prognostic system and method which can be used on a telematics and control platform of a vehicle that uses existing sensors (for example, speed sensors, pressure sensors, temperature sensors, etc.) which are typically present in a wet clutch system is described herein.

The clutch monitoring and prognostic system provides an estimation of a mean coefficient of friction (COF) of the clutch for at least servicing the wet clutch system. The estimated coefficient of friction can also be used for other purposes as well. Further, the coefficient of friction estimation may also be used with clutch control, as the coefficient of friction estimation allows a more accurate calculation of the transmitted torque.

The clutch monitoring and prognostic system is based on an online estimation of the mean coefficient of friction. The estimation method for the mean COF uses new methods, which are described hereinbelow. Three of these methods can be used during an overlap shift of a transmission and a remaining method can be used during a single clutch engagement (for example, during a vehicle launch) of the transmission.

Figure 1:
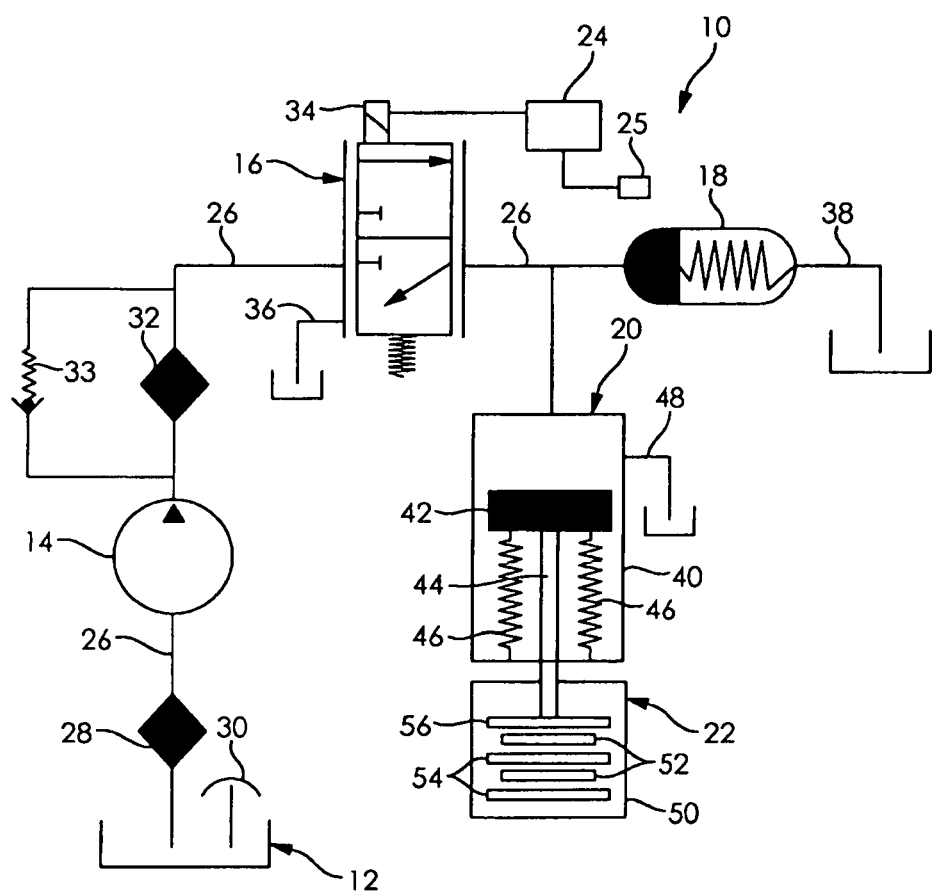
FIG. 1 is a schematic illustration of a wet clutch system according to the present invention.

FIG. 1 illustrates a wet clutch system 10 that may be used with the transmission. The wet clutch system 10 is an electrohydraulically actuated wet multi-plate clutch system. The wet clutch system 10 is an electrohydraulically actuated wet plate clutch system. The wet clutch system 10 comprises a sump 12, a high pressure pump 14, an electroproportional valve 16, an accumulator 18, a piston assembly 20, a clutch assembly 22, a controller 24, and a plurality of fluid conduits 26. It is understood that the wet clutch system 10 may include additional clutch assemblies (not shown). The high pressure pump 14 is in fluid communication with the sump 12 and the electroproportional valve 16. The piston assembly 20 is in fluid communication with the electroproportional valve 16 and the accumulator 18. The clutch assembly 22 is disposed adjacent to and may be placed in contact with a portion of the piston assembly 20. The controller 24 is in communication with the electroproportional valve 16. A signal from a sensor 25 in communication with the controller 24, which may be integrated into the electroproportional valve 16 is used to facilitate the estimation of the mean COF of the clutch assembly 22. The sensor 25 may be a speed sensor, a pressure sensor, a temperature sensor, or a torque sensor. Further, it is understood that the sensor 25 may comprise a plurality or combination of sensors. When the sensor 25 is a speed sensor, for example, the sensor 25 is configured to measure rotational speeds of an input and an output associated with the clutch assembly 22.

The sump 12 is a container in which a hydraulic fluid is stored. The sump 12 is in fluid communication with the high pressure pump 14. One of the fluid conduits 26 affords fluid communication between the sump 12 and the high pressure pump 14. A filter 28 forms a portion of the fluid conduit 26 between the sump 12 and the high pressure pump 14. The sump 12 includes a breather 30, to facilitate fluid communication between an ambient environment of the wet clutch system 10 and an interior of the sump 12.

The high pressure pump 14 is a fixed displacement hydraulic pump. The high pressure pump 14 is in fluid communication with the sump 12 and the electroproportional valve 16. As a non-limiting example, the high pressure pump 14 may generate a pressure of about 20 bar. One of the fluid conduits 26 affords fluid communication between the high pressure pump 14 and the electroproportional valve 16. A filter 32 forms a portion of the fluid conduit 26 between the high pressure pump 14 and the electroproportional valve 16. A pressure relief valve 33 is present to limit a pressure difference across the filter 32 created by the high pressure pump 14, such as if the filter 32 becomes obstructed. Further, it is understood that the high pressure pump 14 may also be in fluid communication with a pressure limiting valve (not shown). The pressure limiting valve limits a pressure within the fluid conduit 26 between the high pressure pump 14 and the electroproportional valve 16.

The electroproportional valve 16 is a hydraulic valve in fluid communication with the high pressure pump 14, the piston assembly 20, and the accumulator 18. The electroproportional valve 16 is in electrical communication with the controller 24. The electroproportional valve 16 is supplied with a pulse width modulated signal to apply a current to a solenoid 34 forming a portion of the electroproportional valve 16. Upon receipt of the pulse width modulated signal, the electroproportional valve 16 may be placed in at least a partially open position. In the open position, the electroproportional valve 16 affords fluid communication between the fluid conduit 26 between the high pressure pump 14 and the electroproportional valve 16 and a fluid conduit 26 between the electroproportional valve 16, the piston assembly 20, and the accumulator 18. It is understood that the controller 24 may adjust the pulse width modulated signal to adjust a pressure within the fluid conduit 26 between the electroproportional valve 16, the piston assembly 20, and the accumulator 18 by placing the electroproportional valve 16 in at least the partially open position. As shown in FIG. 1, the electroproportional valve 16 includes a draining orifice 36. A flow of hydraulic fluid through the draining orifice 36 is dependent on a pressure within the electroproportional valve 16, but also a viscosity of the hydraulic fluid and a temperature of the hydraulic fluid.

The accumulator 18 is a hydraulic device that dampens rapid changes in pressure (such as pressure drops or pressure peaks) within the fluid conduit 26 between the electroproportional valve 16 and the piston assembly 20. The accumulator 18 facilitates smooth operation of the clutch assembly 22. The accumulator 18 is in fluid communication with the piston assembly 20 and the electroproportional valve 16. As shown in FIG. 1, the accumulator 18 includes a draining orifice 38. A flow of hydraulic fluid through the draining orifice 38 is dependent on a pressure within, the fluid conduit 26 between the electroproportional valve 16 and the piston assembly 20, but also a viscosity of the hydraulic fluid and a temperature of the hydraulic fluid.

The piston assembly 20 comprises a housing 40, a piston 42, a piston rod 44, and at least one return spring 46. The housing 40 is a hollow, cylindrical member in fluid communication with the electroproportional valve 16 through the fluid conduit 26 between the electroproportional valve 16, the piston assembly 20, and the accumulator 18. The piston 42 is a cylindrical member sealingly and slidingly disposed within the housing 40. The piston rod 44 is an elongate member in driving engagement with the piston 42. The piston rod 44 is sealingly and slidingly disposed through the housing 40. The at least one return spring 46 is a biasing member disposed between the piston 42 and the housing 40. When pressure at or above an engagement threshold is applied to the housing 40 by the electroproportional valve 16, the pressure within the housing 40 urges the piston 42 and the piston rod 44 towards the clutch assembly 22, while also compressing the at least one return spring 46. When pressure at or below a disengagement threshold is present within the housing 40, the at least one return spring 46 urges the piston 42 and the piston rod 44 into a starting position.

The clutch assembly 22 comprises a housing 50, a first plurality of plates 52, a second plurality of plates 54, and a pressure plate 56. The housing 50 is a hollow member into which a transmission fluid is disposed. The first plurality of plates 52 and the second plurality of plates 54 are rotatably disposed within the housing 50. The pressure plate 56 is disposed adjacent the first plurality of plates 52 and the second plurality of plates 54 and may be urged towards the first plurality of plates 52 and the second plurality of plates 54 by the piston rod 44. The first plurality of plates 52 is interleaved with the second plurality of plates 54. Within the clutch assembly 22, an input member (not shown) is drivingly engaged with one of the first plurality of plates 52 and the second plurality of plates 54 and an output member (not shown) is drivingly engaged with a remaining one of the first plurality of plates 52 and the second plurality of plates 54. A pressure in which the piston rod 44 contacts the pressure plate 56 and where additional pressure would result in at least variable driving engagement between the first plurality of plates 52 and the second plurality of plates 54 is known as a kiss pressure. At pressures greater than the kiss pressure, torque is able to be transferred from the first plurality of plates 52 to the second plurality of plates 54 or from the second plurality of plates 54 to the first plurality of plates, depending on a configuration of the clutch assembly 22. When pressure at or above the engagement threshold is applied to the housing 40 by the electroproportional valve 16, the pressure within the housing 40 urges the piston 42 and the piston rod 44 towards the clutch assembly 22, applying a pressure to the first plurality of plates 52 and the second plurality of plates 54 through the pressure plate 56.

In response to the pressure, the first plurality of plates 52 becomes at least variably drivingly engaged with the second plurality of plates 54, causing the input member to be at least variably drivingly engaged with the output member.

Figure 2:
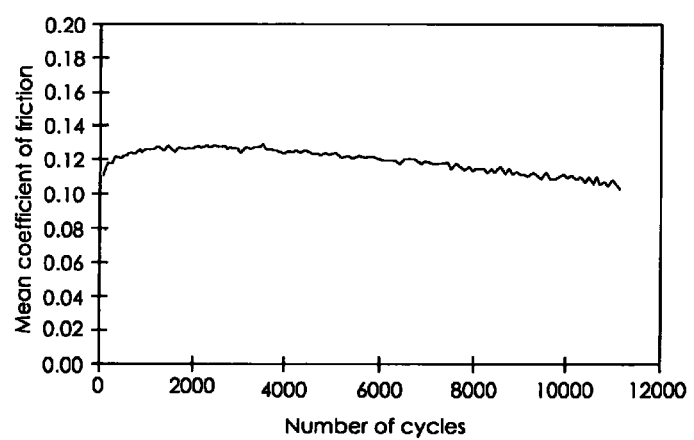
FIG. 2 is a graph which illustrates an exemplary degradation of the mean coefficient of friction of a portion of a wet clutch system with respect to a number of cycles of use of the wet clutch system.

The basis of a remaining useful life determination for the wet clutch system 10 is formed by an estimation of the mean coefficient of friction of the plurality of plates 52, 54. FIG. 2 illustrates an exemplary degradation of the mean coefficient of friction of the plurality of plates 52, 54 with respect to a number of cycles of use of the wet clutch system.

Figure 3:
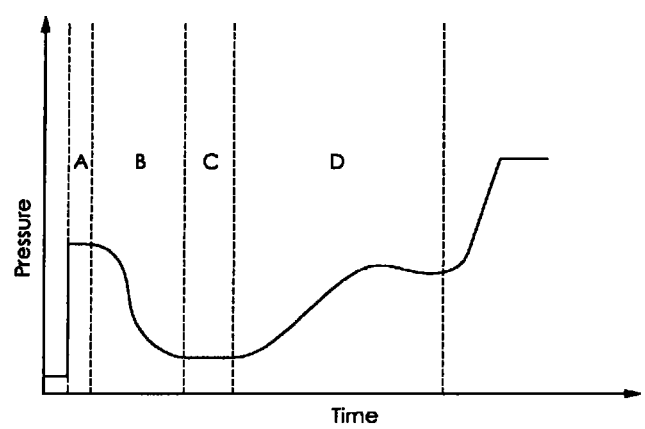
FIG. 3 is a graph which illustrates a pressure profile of an engaging hydraulic piston associated with the wet clutch system illustrated in FIG. 1.

In several applications only one clutch, such as the clutch assembly 22, has to be engaged, without the need to simultaneously release a second clutch. For example, such a process occurs with the clutch assembly 22 is an axle brake clutch or when the clutch assembly 22 forms a portion of a transmission and is used for a vehicle launch. During engagement of the clutch assembly 22, a pressure profile is imposed on the piston 42 of the piston assembly 20, which is shown in FIG. 1. An exemplary pressure profile is shown in FIG. 3. The pressure profile consists of several intervals: filling the housing 40, synchronize the clutch assembly 22, and finally a locking-up of the clutch assembly 22. The pressure profile shown in FIG. 3 is divided into sections A, B, C, and D, representing different stages of the engagement of the clutch assembly 22. Such a method can be applied during the synchronization phase of the step of actuating the clutch assembly 22. The synchronization phase of the clutch assembly 22 occurs in section D and beyond. A torque transmitted by the clutch assembly 22 during a slipping condition of the clutch assembly 22 is proportional to:

An area and a number of the plurality of plates 52, 54
A net pressure on the plurality of plates 52, 54 (hydraulic pressure minus a force applied by the return spring 46)
The mean coefficient of friction the plurality of plates 52, 54

As torque transmitted by the clutch assembly 22 is proportional to the COF and a net pressure imposed on the piston 42, a first estimate is made by dividing a torque value by the net pressure and filtering the resulting value. The torque value can be obtained from a torque converter look-up table (turbine torque follows from the lookup-table and a measured speed ratio), or can be estimated by an angular displacement estimation method (the angular displacement of two non-slipping ends of a shaft is proportional to the applied torque and the torsional stiffness of the shaft), or by any other torque estimation or measurement.

In several applications a power shift, also known as an overlap shift, is performed where one clutch assembly 22 is engaged while another clutch assembly (not shown) is simultaneously disengaged. An exemplary pressure profile for both an ongoing and an offgoing clutch during the overlap shift is shown in FIG. 4.

Three methods, which are discussed hereinbelow, may be used to estimate the mean COF during the overlap shift. Each of these methods may be used in a different part of the engagement process during the overlap shift. Each of these methods are noted with corresponding numbers, which appear in FIG. 4.

The pressure profile for the overlap shift comprises several intervals: filling the housing 40, a stabilization period of the offgoing clutch, and an inertial or synchronization phase of the clutch assembly 22. The pressure profile shown in FIG. 4 is divided into the sections Filling, Torque, and Inertia, representing different stages of the overlap shift.

Figure 4:
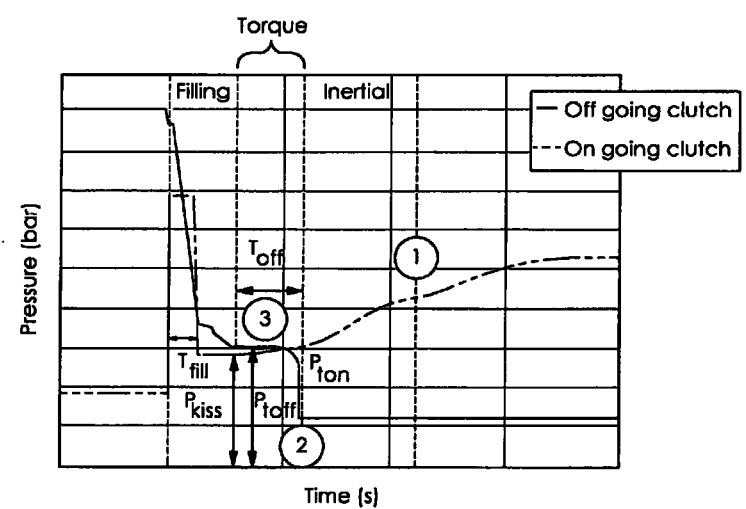
FIG. 4 is a graph which illustrates a pressure profile of an ongoing hydraulic piston and an offgoing hydraulic piston associated with a wet clutch system similar to the wet clutch system illustrated in FIG. 1.

A first method can be applied during the inertial or synchronization phase of the clutch, indicated in FIG. 4 by number 1. As torque transmitted by the ongoing clutch is proportional to the COF and the net pressure on the piston, a first estimate is made by dividing a torque value by the net pressure and filtering the resulting value. The torque value can be obtained using various methods, such as measurement or estimation.

In a second method, during the unloading of the offgoing clutch, the offgoing clutch releases and starts slipping at a certain pressure, which is dependent on the torque transmitted and the COF. This slipping point is indicated in FIG. 4 by number 2. The slipping point can be characterized using a slip speed and a measured pressure. Using the speed and pressure sensors, a release time (when the slip speed differs from a value of zero) and a release pressure can thus be used to estimate the mean COF.

In a third method, during the stabilization period of the offgoing clutch, which is indicated in FIG. 4 by number 3, the pressure is kept constant or the slip speed is controlled prior to fully unloading the offgoing clutch, and a method similar to the first method can be used.

Due to the noise in the measurements, the measurements need to be filtered. For each clutch assembly, there will be estimations for the mean COF available using each of the different methods. The filtered results need to be combined to give a single estimation value. Combination of the filtered results is performed by weighing the values in an appropriate way.

The information from the speed, temperature and pressure sensors from every engaging and disengaging clutch assembly 22 in the transmission, as well as estimated or measured torque signals, are sent to the controller 24 (or another CPU) to perform the estimation of the mean COF. The estimated values are aggregated in the controller 24 and compared to a learned or stored relationship between the mean COF and a wear of the friction plates. The controller 24 then computes the remaining useful life of the clutch assembly 22 and sends data regarding a current condition of the clutch assembly 22, the remaining useful life of the clutch assembly 22, and a next estimated maintenance of the clutch assembly 22 to a user interface of the vehicle. The user interface can be any kind of interface, including a dashboard or a telematics interface.

The estimated value of the mean COF for the clutch assembly 22 can be used in other applications as well. For example, one use would be in the controller 24, where the mean COF may be used to derive appropriate slip or pressure reference values for the clutch assembly 22.

The application of the monitoring and prognostics system for the clutch assembly 22 increases a productivity of a vehicle the wet clutch system 10 is incorporated in. More particularly, productivity of the vehicle is increased by increasing a time between vehicle servicing intervals, since a remaining useful life of the clutch assembly 22 can be monitored and known. Under such circumstances, when a remaining useful life of the clutch assembly 22 is near its end, the clutch assembly 22 can be serviced or replaced at a convenient time to the owner or operator of the vehicle. Further, the monitoring and prognostics system prevents a possibility that the clutch assembly 22, or other vehicle parts, may be damaged when the clutch assembly 22 unexpectedly reaches an end of its useful life.

Moreover, the estimated value of the mean COF can be used to monitor the current state of a transmission in many different fields, such as industrial robots and machine tools, for example. One of such possible uses is to detect efficiency losses and shortened service life due to component wear. For example, engine components and energy conversion devices, such as pumps and motors, often include gears, bearings, and other movable components which translate and rotate with respect to a fixed surface. Therefore, a monitoring of the friction between movable parts which causes the degradation, for example wear of, the movable components, is a very important task. One of the estimation techniques may be used to identify the mean COF based on a real time knowledge of an axis or joint displacement and a torsional stiffness.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for determining a remaining useful life of a portion of a wet clutch system, the method comprising the steps of:
   providing the wet clutch system, the wet clutch system comprising:
      a first clutch assembly rotatingly disposed in a housing, a first portion of the first clutch assembly drivingly engaged with an input member and a second portion of the first clutch assembly drivingly engaged with an output member,
      a proportional valve for regulating a pressure applied to the first clutch assembly, a controller controlling the proportional valve;
   actuating the first clutch assembly to one of engage and disengage the first portion of the first clutch assembly with the second portion of the first clutch assembly;
   obtaining torque values of the first clutch assembly via a sensor during the actuation of the first clutch, the sensor connected to the controller for communicating the torque values to the controller;
   obtaining pressure values of the pressure applied to the first clutch assembly during the actuation of the first clutch assembly for use by the controller;
   calculating coefficient of friction values of the first clutch assembly by the controller dividing each torque value by an associated pressure value;
   calculating a mean coefficient of friction by the controller from the calculated coefficient of friction values; and
   determining a remaining useful life of a portion of the wet clutch system based on the mean coefficient of friction of the first clutch assembly.

2. The method according to claim 1, wherein the torque values-are obtained using a speed sensor for measuring the rotation speed of the first portion of the first clutch assembly and at least one of a torque converter look-up table and an angular displacement estimation method.

3. The method according to claim 1, wherein the step of calculating a mean coefficient of friction of the first clutch assembly includes filtering the calculated coefficient of friction values.

4. The method according to claim 1, wherein the step of actuating the first clutch assembly to one of engage and disengage the first portion of the first clutch assembly with the second portion of the first clutch assembly is performed by engaging the first portion of the first clutch assembly with the second portion of the first clutch assembly during at least one of a vehicle launch and an axle braking process.

5. The method according to claim 1, wherein the step of obtaining torque values and obtaining pressure values of the first clutch assembly-are performed during a slipping condition of the first clutch assembly.

6. The method according to claim 1, further comprising a second clutch assembly rotatingly disposed in a housing comprising a first portion drivingly engaged with an input member and a second portion drivingly engaged with an output member.

7. The method according to claim 6, wherein the step of actuating the first clutch assembly to one of engage and disengage the first portion of the first clutch assembly with the second portion of the first clutch assembly further comprises the step of actuating the second clutch assembly to one of engage and disengage the first portion of the second clutch assembly with the second portion of the second clutch assembly.

8. The method according to claim 7, wherein the step of actuating the first clutch assembly and the second clutch assembly is an overlap shift.

9. The method according to claim 7, wherein the first clutch assembly is an ongoing clutch and the second clutch assembly is an offgoing clutch.

10. The method according to claim 7, further comprising the step of obtaining torque values of the second clutch assembly using a sensor and obtaining pressure values via a pressure sensor of the pressure applied to the second clutch assembly during a slipping condition of the second clutch assembly.

11. The method according to claim 10, wherein the step of obtaining torque values of the second clutch assembly during a slipping condition of the second clutch assembly is performed by obtaining a torque value transmitted through the second.

12. The method according to claim 10, wherein the step of obtaining torque values of the second clutch assembly during a slipping condition of the second clutch assembly is performed by using a speed sensor for measuring the rotation of the first portion of the second clutch assembly and an angular displacement estimation method.

13. The method according to claim 10, further comprising the step of calculating coefficient of friction values of the second clutch assembly by dividing each torque value of the second clutch assembly by an associated pressure value of the second clutch assembly; and the step of calculating a mean coefficient of friction of the second clutch assembly from the calculated coefficient of friction values of the second clutch assembly.

14. The method of claim 1 wherein the pressure values are obtained by a pressure sensor and provided to the controller or are obtained by using pressures values imposed on the proportional valve by the controller.

15. The method of claim 1 wherein the determining a remaining useful life of a portion of the wet clutch system is based on a stored or learned relationship between the mean coefficient of friction and the clutch cycle life.

16. A method for determining a remaining useful life of a portion of a wet clutch system, the method comprising the steps of:
providing the wet clutch system, the wet clutch system comprising:
a first clutch assembly rotatingly disposed in a housing, a first portion of the first clutch assembly drivingly engaged with an input member and a second portion of the first clutch assembly drivingly engaged with an output member,
a second clutch assembly rotatingly disposed in a housing comprising a first portion drivingly engaged with an input member and a second portion drivingly engaged with an output member,
a proportional valve for regulating a pressure applied to the first clutch assembly and the second clutch assembly,
a controller controlling the proportional valve,
actuating the first clutch assembly to one of engage and disengage the first portion of the first clutch assembly with the second portion of the first clutch assembly;
actuating the second clutch assembly to one of engage and disengage the first portion of the second clutch assembly with the second portion of the second clutch assembly;
obtaining a torque value and a pressure value of one of the first clutch assembly and the second clutch assembly for each of a plurality of actuations of a respective one of the first clutch assembly and the second clutch assembly;
calculating with the controller coefficient of friction values of the respective one of the first clutch assembly and the second clutch assembly by dividing each torque value by an associated pressure value;
calculating a mean coefficient of friction of the respective one of the first clutch assembly and the second clutch assembly from the calculated coefficient of friction values; and
determining a remaining useful life of the respective one of the first clutch assembly and second clutch assembly based on the mean coefficient of friction of respective one of the first clutch assembly and the second clutch assembly.

17. The method according to claim 16, wherein torque values are obtained by a speed sensor measuring the rotation speed of the first portion of one of the first clutch assembly and second clutch assembly and at least one of a torque converter look-up table and an angular displacement estimation method and the pressure values are obtained by a pressure sensor.

18. The method according to claim 16, wherein the step of obtaining a torque and pressure value is performed during a slipping condition of the respective one of the first clutch assembly and the second clutch assembly.

19. The method of claim 16 wherein the determining a remaining useful life of a portion of the wet clutch system is based on a stored or learned relationship between the mean coefficient of friction and the clutch cycle life.

20. A system for determining a remaining useful life of a portion of a wet clutch system, the system comprising:
a first clutch assembly rotatingly disposed in a housing, a first portion of the first clutch assembly drivingly engaged with an input member and a second portion of the first clutch assembly drivingly engaged with an output member;
a proportional valve for regulating a pressure applied to the first clutch assembly;
a sensor for obtaining a torque value of the first clutch assembly during a slipping condition of the first portion of the first clutch assembly with the second portion of the first clutch assembly; and a controller controlling the proportional valve, wherein the controller calculates a plurality of coefficient of friction values of the first clutch assembly by dividing a torque value of the first clutch assembly by a pressure applied to the first clutch assembly for a plurality of actuations of the first clutch assembly, and the controller calculates a mean coefficient of friction from the calculated coefficient of friction values to determine a remaining useful life of a portion of the wet clutch system based on the mean coefficient of friction of the first clutch assembly and a stored or learned relationship between the mean coefficient of friction and the clutch cycle life.

* * * * *

UNITED STATES PATENT AND TRADEMARK OFFICE
CERTIFICATE OF CORRECTION

PATENT NO. : 9,856,932 B2
APPLICATION NO. : 14/392379
DATED : January 2, 2018
INVENTOR(S) : Mark R. J. Versteyhe and Keivan Shariatmadar It is certified that error appears in the above-identified patent and that said Letters Patent is hereby corrected as shown below:

Claim 2, Column 8, Line 2, remove the "-" between "values-are";

Claim 5, Column 8, Line 3, remove the "-" between "assembly-are";

Claim 11, Column 9, Line 5, add "clutch assembly using a speed sensor for measuring the rotation of the first portion of the second clutch assembly and a torque converter look-up table".

Signed and Sealed this
Tenth Day of April, 2018

Andrei Iancu
*Director of the United States Patent and Trademark Office*